(12) United States Patent
Sagna et al.

(10) Patent No.: US 9,951,923 B2
(45) Date of Patent: Apr. 24, 2018

(54) OPTICAL DEVICE AND SIGNALING AND/OR LIGHTING SYSTEM FOR AN AUTOMOTIVE VEHICLE

(71) Applicant: Valeo Illuminacion, Martos (ES)

(72) Inventors: Boubacar Sagna, Sartrouville (FR); Antoine de Lamberterie, Paris (FR); Juan Manuel Martinez, Granada (ES); Maria-Del-Carmen Montano, Martos (ES); Jesus Romo, Martos (ES)

(73) Assignee: VALEO ILUMINACION, Martos (ES)

( * ) Notice: Subject to any disclaimer, the term of this patent is extended or adjusted under 35 U.S.C. 154(b) by 51 days.

(21) Appl. No.: 15/278,119

(22) Filed: Sep. 28, 2016

(65) Prior Publication Data

US 2017/0089540 A1    Mar. 30, 2017

(30) Foreign Application Priority Data

Sep. 30, 2015 (FR) ...................... 15 59313

(51) Int. Cl.
*F21S 8/10* (2006.01)
*B60Q 1/02* (2006.01)
*B60Q 1/34* (2006.01)
*F21V 8/00* (2006.01)
*B60Q 1/38* (2006.01)

(52) U.S. Cl.
CPC ............ *F21S 48/2243* (2013.01); *B60Q 1/02* (2013.01); *B60Q 1/34* (2013.01); *B60Q 1/38* (2013.01); *F21S 48/115* (2013.01); *F21S 48/1241* (2013.01); *F21S 48/215* (2013.01); *F21S 48/2231* (2013.01); *F21S 48/2237* (2013.01); *F21S 48/2262* (2013.01); *F21S 48/2268* (2013.01); *F21S 48/2281* (2013.01); *G02B 6/0011* (2013.01); *G02B 6/0033* (2013.01); *G02B 6/0096* (2013.01); *B60Q 2400/30* (2013.01)

(58) Field of Classification Search
None
See application file for complete search history.

(56) References Cited

U.S. PATENT DOCUMENTS

| 6,910,783 | B2 | 6/2005 | Mezei et al. |
| 8,545,070 | B2 | 10/2013 | Sakiyama et al. |
| 8,888,343 | B2 | 11/2014 | de Lamberterie |
| 9,435,506 | B2 * | 9/2016 | Ritter .................. B60Q 1/0041 |

(Continued)

FOREIGN PATENT DOCUMENTS

| DE | 102013104169 A1 | 10/2014 |
| EP | 2261083 A1 | 12/2010 |
| EP | 2541128 A2 | 1/2013 |

*Primary Examiner* — Britt D Hanley
(74) *Attorney, Agent, or Firm* — Oblon, McClelland, Maier & Neustadt, L.L.P.

(57) ABSTRACT

An optical device comprising at least one first light guide having an exit face. The first guide is configured to propagate the light rays emitted by a first light source toward its exit face. The exit face is placed facing a coupling zone that forms part of the lateral surface of a generally tubular second light guide of the optical device. The optical device allows the transmission of the light emitted via the exit face of the first guide through the second guide to be improved. The optical device especially proposes the implementation of a luminous device for an automotive vehicle integrating two luminous functions.

20 Claims, 1 Drawing Sheet

(56) References Cited

U.S. PATENT DOCUMENTS

| | | |
|---|---|---|
| 9,651,211 B2 * | 5/2017 | Potter ................ F21S 48/1241 |
| 2004/0066659 A1 | 4/2004 | Mezei et al. |
| 2005/0210643 A1 | 9/2005 | Mezei et al. |
| 2009/0185389 A1 | 7/2009 | Tessnow et al. |
| 2011/0007518 A1 * | 1/2011 | de Lamberterie ... B60Q 1/2607 362/511 |
| 2011/0013411 A1 | 1/2011 | Sakiyama et al. |
| 2013/0003399 A1 | 1/2013 | de Lamberterie |
| 2014/0153272 A1 * | 6/2014 | Giraud ................ F21S 48/2237 362/511 |

* cited by examiner

OPTICAL DEVICE AND SIGNALING AND/OR LIGHTING SYSTEM FOR AN AUTOMOTIVE VEHICLE

CROSS-REFERENCE TO RELATED APPLICATIONS

This application claims priority to the French application 1559313 filed Sep. 30, 2015, which application is incorporated herein by reference and made a part hereof.

BACKGROUND OF THE INVENTION

1. Field of the Invention

The present invention relates to an optical device and in particular to a lighting and/or signaling system for an automotive vehicle, the system being equipped with such a device.

2. Description of the Related Art

A direction indicator light of an automotive vehicle serves to let the drivers of vehicles in nearby road traffic know that the driver wants to change direction. Correct and rapid perception of the indicator light is a key factor in road safety. It is known that a direction indicator light is a light that emits a flashing luminous signal in red or amber light, the color and how fast the light flashes being chosen to rapidly draw the attention of an observer to the emitted signal.

The use of a sequential direction indicator light ("tracer light") allows the perceivability of such a signal to be increased and road safety to be improved. Specifically, the Human Visual System rapidly reacts to a perceived movement. In general, a moving light is perceived more rapidly than a changing color and even more more rapidly than a flashing light.

The use of light-emitting diodes (LEDs) is increasingly advocated in the field of automotive vehicles as a way of providing luminous functions such as daytime running lights, signal lights, or for example direction indicator lights.

The use of light guides to guide the light emitted by an LED or a group of LEDs is also a measure applied in the luminous devices of automotive vehicles. This technique allows a high degree of flexibility to be obtained in the design of a headlamp, especially as regards the arrangement of the LEDs, the physical location of which crucially must not correspond to the location of the light spots that they are intended to produce. One light guide known in the prior art may be used to guide the light emitted by an LED mounted at a first end to a different second end. Alternatively, a slab light guide may be used in order to illuminate a strip, corresponding to the output of the guide, relatively uniformly using one or more LEDs.

As is known, it is possible to use light guides placed in a row to produce a sequential direction indicator. Each guide or guide portion corresponds to a division of the direction indicator and turning on the divisions one by one allows a sequential effect to be obtained.

It has been proposed, for example in patent document EP 2 541 128, which is equivalent to U.S. Pat. No. 8,888,343 and U.S. Patent Publication No. 2013/0003399, to use a plurality of light guides within a given optical device to produce a plurality of luminous functions of a lighting or signaling device of an automotive vehicle. The integration of a plurality of luminous functions, for example, a sequential direction indicator function and a daytime running light function, allows, on the one hand, the bulk in the restricted space afforded by a vehicle light to be decreased, and on the other hand, allows interesting optical signatures to be produced.

In the solution known from EP 2 541 128, a daytime running light function may be produced by a cylindrical light guide arranged behind an exit face of a slab guide, which may provide a direction indicator function. The intensity of the visible light flux emitted by the first light guide may however be decreased by the passage of the emitted rays through part of the second guide.

Patent document DE 10 2013 104 169 proposes to place a first light guide having a cylindrical exit face in front of a slab guide. In this arrangement, the intensity of light flux emitted by the slab guide is decreased by the passage of the emitted rays through part of the first guide.

SUMMARY OF THE INVENTION

The objective of the invention is to mitigate at least one of the problems posed by the prior art.

One subject of the invention is an optical device comprising at least one first light guide having an exit face. The first light guide is configured to propagate the light rays emitted by a first light source toward its exit face. The exit face is placed facing a coupling zone forming part of the lateral surface of a generally tubular second light guide. The second light guide furthermore comprises an exit face opposite the coupling zone. The second light guide is arranged so as to propagate the light rays entering via the coupling zone, and light rays emitted by at least one second light source and entering via at least one of the ends of the tube, toward its exit face. The optical device is noteworthy in that the second light guide comprises at least one segment, the cross section of which comprises a portion having an elliptical outline.

Preferably, the elliptical portion may comprise the cross section of the exit face of the second light guide.

The outline of the cross section may preferably comprise a frustoconical portion, the small base of which corresponds to the coupling zone.

Preferably, the outline of the cross section of the segment of the second light guide may be an ellipse.

The segment and the exit face may preferably extend the entire length of the second light guide.

Preferably, the second light guide may comprise at least one second segment, a section of which comprises a portion having an elliptical outline.

The first light guide(s) may preferably each comprise a slab-shaped main propagation zone.

Preferably, the longitudinal direction of the second light guide may be substantially perpendicular to the propagation direction of the light rays in the main propagation zone of the first light guide(s).

The combined thickness of the exit faces of the first light guides may preferably be larger than or equal to the corresponding thickness of the coupling zone of the second light guide.

Another subject of the invention is a lighting system for an automotive vehicle comprising a first light source and a second light source. The lighting system is noteworthy in that it comprises an optical device according to the invention.

The second light source may preferably comprise a pair of light-emitting diodes, each at one end of the second light guide.

Preferably, the first light source may be configured to emit a flashing turn-signal light flux.

The flashing light flux may preferably be a sequential turn-signal light flux.

The second light source may preferably be configured to emit a daytime running flux.

According to the measures of the invention, an optical device comprising two types of distinct light guides is used to obtain a lighting system providing two separate lighting or signaling functions of an automotive vehicle. As the guiding slab or first light guide, which preferably produces the sequential direction indicator luminous function, is placed behind the tubular second light guide, which preferably produces the daytime running light function, bulk is decreased with respect to a conventional arrangement in which the two types of light guides are placed side by side. With respect to known solutions having similar arrangements but employing tubular light guides having circular cross sections, by virtue of the elliptical profile of the tubular light guide according to the invention the light intensity perceived from the guiding slab or second light guide and transmitted through the tubular light guide is clearly increased. In a comparison of the optical device according to the invention to a similar device but with a cylindrical second light guide, it was possible to measure an increase of about 30% in the perceived light flux emitted from the guiding slab or first light guide.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood from the exemplary description and drawings, in which.

DETAILED DESCRIPTION OF THE PREFERRED EMBODIMENTS

In the following description, similar reference numbers will be used to reference similar concepts in all the various embodiments of the invention. Thus, the numbers 100 and 200 reference an optical device in two different embodiments according to the invention.

Unless specifically indicated otherwise, technical features described in detail for one given embodiment may be combined with the technical features described in the context of other embodiments, the various embodiments being given by way of nonlimiting examples.

Generally, the invention may use light sources of the light-emitting diode (LED) type. As is known, LEDs comprise a semiconductor element that is able to emit light of a preset color when it is passed through by a preset current. In the following description, a light source may describe a set of elementary sources that are used to produce a single luminous function, each elementary source being, by way of example, an LED.

The optical device according to the invention takes advantage, as regards the light guides, of known techniques allowing the light rays emitted by a light source to propagate through the constituent medium of the light guide. For example, the first and second light guides, which will be described below, may be produced from materials such as polymethyl methacrylate (PMMA), polycarbonate (PC), silicone or other materials preferably having a refractive index comprised between 1.49 and 1.59.

Figure 1:
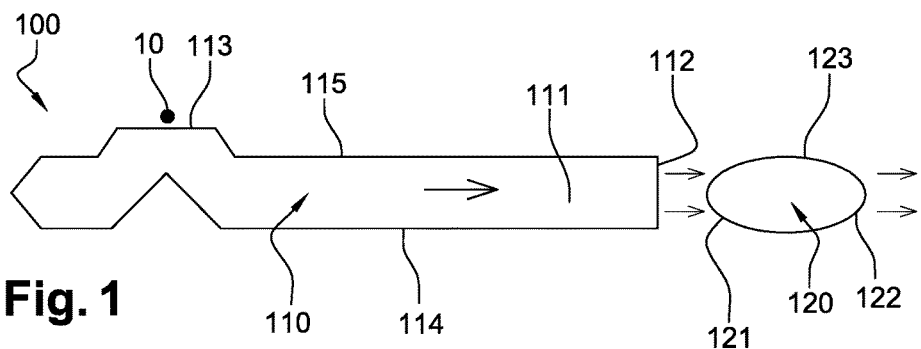
FIG. 1 shows a schematic view of a transverse cross section of the device according to one preferred embodiment of the invention.

FIG. 1 shows an illustration of a first embodiment of the optical device 100 according to the invention. The optical device comprises a first light guide 110 having an exit face 112. The first light guide 110 is configured to propagate the light rays emitted by a first light source 10 toward its exit face 112. The exit face 112 is placed facing a coupling zone 121 which forms part of the lateral surface of a second light guide or tubular guide 120 having a substantially tubular geometry. At least some of the light rays emitted by the first light guide 110 through the exit face 112 enter into the second light guide 120 through the coupling zone 121.

The second light guide 120 is a tubular guide consisting of an essentially elongate body. It also comprises an exit face 122, opposite its coupling zone 121. The second light guide 120 is arranged so as to propagate the light rays entering into the second light guide or tubular guide 120 via the coupling zone 121, and the light rays emitted by at least one second light source (not illustrated) and entering via at least one of the ends of the tubular guide 120, toward its exit face 122. As indicated by the illustration in FIG. 1, the second light guide 120 comprises at least one segment, the cross section 123 of which comprises a portion of elliptical outline. In this case, the illustration shows the nonlimiting example in which the cross section 123 is an ellipse. The major axis of the ellipse is generally aligned over the longitudinal extent of the first light guide 110. The coupling zone 121 and exit face 122 are opposite parts of the lateral surface of the tubular guide 120. The segment having the cross section of outline according to the invention may represent some of the extent of the tubular guide 120 or, alternatively, it may constitute the whole of the tubular guide 120. In the latter case, all the cross sections 123 of the tubular guide 120 have an outline having at least one elliptical portion. Preferably, the elliptical part corresponds to the location of the exit face 122 of the tubular guide 120.

One preferred embodiment of the first light guide 110 is detailed in the illustration in FIG. 1. The cross section 123 is taken parallel to the propagation direction of the light rays in a main propagation zone 111 of the first light guide 110. The first light guide 110 comprises an entrance face 113 via which the light rays emitted by a first light source 10 are admitted. From the entrance face 113, the light rays follow a path that is at first mainly oriented through the thickness of the first light guide 110, and then undergo at least one reflection from a reflective surface, the reflected light rays being directed into the main propagation zone 111 so that they exit from the first light guide 110 via the exit face 112. At least the main propagation zone 111 forms a slab shape having a thickness smaller than its length and possibly being curved to adopt a given curvature.

The propagation zone 111 is bounded vertically by an upper guiding face 115 and a guiding face 114. The upper guiding face 115 and guiding face 114 are preferably parallel and spaced apart so that the propagation zone 111 has a constant vertical thickness that is small with respect to its longitudinal and transverse dimensions. The invention allows the guiding slab or first light guide 110 to have any shape and dimension, and allows a high degree of flexibility in the design of the first light guide 110 and hence it may be adapted to the luminous function to be produced by way of the first light source 10.

Use of a tubular guide 120 allows part of the second light source to be placed at one end of the second light guide 120 and advantageously two elementary light sources of the second light source each to be placed at one end of the second light guide 120. The use of a tubular guide 120 as second light guide 120 allows it to be oriented substantially transversely to the guiding slab or first light guide 110 forming the main propagation zone 111 of the first light guide 110.

Figure 2:
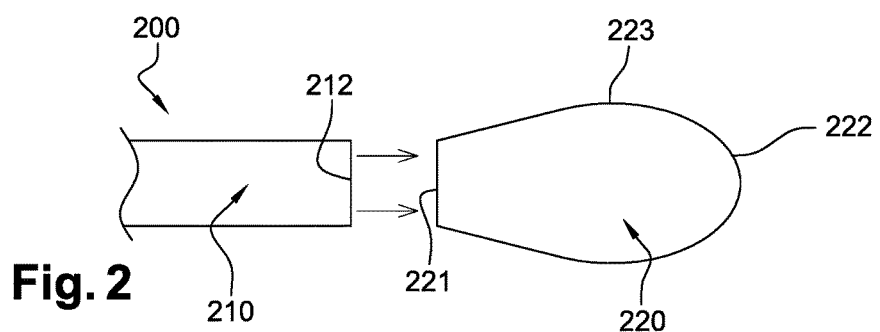
FIG. 2 shows a schematic view of a transverse cross section of the device according to one preferred embodiment of the invention.

FIG. 2 shows a second embodiment of the optical device 200 according to the invention. The first light guide 210 is essentially similar to the first light guide 110 that was described above. The second light guide 220 of generally tubular geometry comprises a generally planar coupling zone 221 facing the exit face 212 of the first light guide 210. The relative arrangement of the first light guide 210 and second light guide 220 is such that at least some of the light rays emitted via the exit face 212 enter into the second light guide 220 through the coupling zone 221. The planar geometry of the coupling zone 221 promotes the entrance of the light rays into the second light guide 220. The illustrated section of the second light guide 220 is a cross section 223. The part of the outline of the cross section 223 that corresponds to the coupling zone 221 forms the small base of a truncated cone that widens in the direction of the exit face 222. On the side of the exit face 222, the cross section 223 comprises an elliptical portion. As is known, the coupling zone 221 may be used as the base of reflective prisms placed inside the second light guide 220 and able to deviate light rays propagating in the medium of the second light guide 220 toward the exit face 222. The coupling zone 221 is located in the vicinity of one of the focal points of the ellipse defining the exit face 222, said vicinity being defined by the size of the reflective prisms and usually being smaller than 2 mm.

Figure 3:
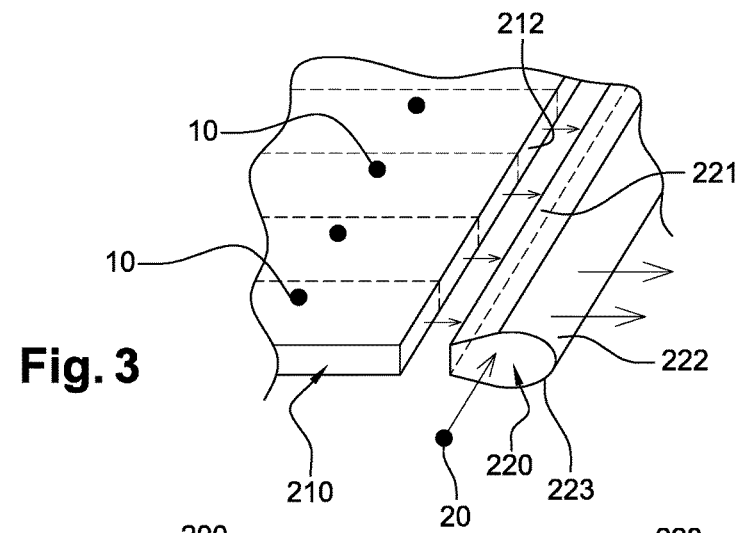
FIG. 3 shows a schematic perspective view of the device according to one preferred embodiment of the invention.

FIG. 3 shows a schematic perspective view of the embodiment in FIG. 2. It may be seen that the first light guide 210 comprises a plurality of similar divisions in a direction perpendicular to the main propagation direction of the first light guide 210. It may also be a question of a plurality of equivalent guides placed in a row. As is known, the divisions may, for example, be sequentially illuminated by way of first light sources 10 in order to produce a sequential luminous function. The second light source 20 serves to illuminate the second light guide 220. The light rays emitted by the second light source 20 enter into the second light guide 220 via one end of the tubular structure in order to be propagated therein and directed toward the exit face 222. Although the illustrated example shows first light guide 210 and second light guide 220 of essentially right extent, the first light guide 210 and second light guide 220 may have curves according to a given curvature without departing from the scope of the present invention.

Figure 4:
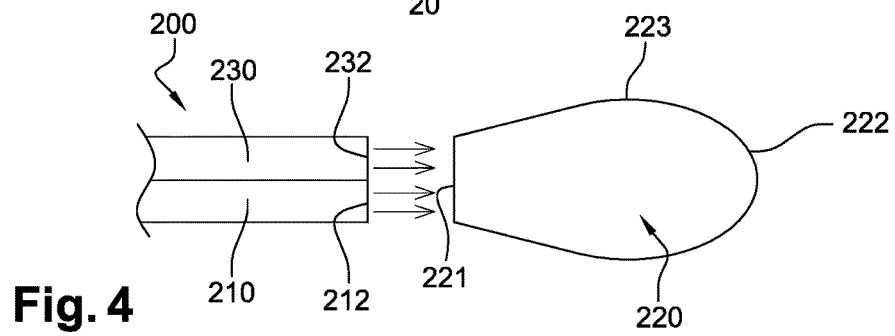
FIG. 4 shows a schematic view of a transverse cross section of the device according to one preferred embodiment of the invention.

The thickness of the guiding slab 210 is preferably larger than or equal to the corresponding thickness of the coupling zone 221 of the second light guide 220. In the alternative embodiment illustrated in FIG. 4, two guiding slabs or first light guides 210, 230 are placed in two superposed rows. In this case, the combined thickness of the guiding slabs 210, 230 is preferably larger than or equal to the corresponding thickness of the coupling zone 221 of the second light guide 220. The arrangement is such that the exit faces 212, 232 face the coupling zone 221. Obviously, a larger plurality of first light guides may be superposed without however departing from the scope of the invention.

When the first light guides 110, 210, 230 and second light guides 120, 220 have curved portions, the second light guides 120, 220, placed parallel to the exit faces 112, 212, 232 of the first light guides 110, 210, 230, preferably comprises at least one segment having an arbitrary transverse section that corresponds to the elliptical outline just described. The plane in which the elliptical outline is located is calculated using optical simulation means in a known way and so as to orient the light rays that are emitted via the exit faces 122, 222 of the tubular guides or second light guides 120, 220 in the same direction, independently of the right or curved segment of the tubular structure, while in particular taking account of the refractions engendered by each curved interface, which depend on the local curvature and refractive index of the first light guides 110, 210, 230 and second light guides 120, 220.

Preferably, the optical device according to the invention is applied in a luminous device for an automotive vehicle. It may, for example, be a question of a signaling device such as a daytime running light with integrated sequential direction indicator. One example is given with reference to the optical device in FIG. 3. A luminous device of an automotive vehicle comprises, as is known, means for controlling the electrical power supply of the light sources or LEDs 10, 20. The means for controlling electrical power supply in general comprise a converter element able to convert an electrical current of a first magnitude, delivered by an internal current source of the vehicle such as a battery, into a load current have a different second magnitude and able to power the LEDs 10, 20, which are mounted so as to load the converter element.

A microcontroller element may, as is known, be used to program the selective and/or sequential supply of power to the plurality of first light sources 10 as shown in FIG. 3. Thus, a sequential direction indicator light may be produced. The various divisions of the exit face 212 of the first light guide 210 are illuminated if the light sources 10 associated therewith are adequately supplied with power. The light emitted by each of the divisions of the exit face 212 is transmitted through the second light guide 220 and its exit face 222. When the second light sources 20 are supplied with power, the tubular guide or second light guide 220 is illuminated over its entire length and the light rays are emitted via the exit face 222.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical device comprising at least one first light guide having an exit face, said at least one first light guide being configured to propagate light rays emitted by a first light source toward said exit face, said exit face being placed facing a coupling zone forming part of a lateral surface of a generally tubular shaped second light guide, in said optical device said second light guide furthermore comprises an exit face opposite said coupling zone, said second light guide being arranged so as to propagate said light rays entering via said coupling zone, and light rays emitted by at least one second light source and entering via at least one of the ends of said second light guide, toward said exit face, wherein said second light guide comprises at least one segment a cross section of which comprises a portion having an elliptical outline.

2. The optical device according to claim 1, wherein said elliptical outline comprises said cross section of said exit face of said second light guide.

3. The optical device according to claim 1, wherein said elliptical outline of said cross section comprises a frusto-conical portion, the small base of which corresponds to said coupling zone.

4. The optical device according to claim 1, wherein said elliptical outline of said cross section of said at least one segment of said second light guide is an ellipse.

5. The optical device according to claim 1, wherein said at least one segment and said exit face extend the entire length of said second light guide.

6. The optical device according to claim 1, wherein said second light guide comprises at least one second segment, a section of which comprises a portion having an elliptical outline.

7. The optical device according to claim 1, wherein said at least one first light guide comprises a slab-shaped main propagation zone.

8. The optical device according to claim 7, wherein a longitudinal direction of said second light guide is substantially perpendicular to the propagation direction of said light rays in the main propagation zone of said at least one first light guide.

9. The optical device according to claim 1, wherein a combined thickness of said exit face of said at least one first light guide is larger than or equal to a corresponding thickness of said coupling zone of said second light guide.

10. A lighting system for an automotive vehicle, comprising at least one first light source and a second light source, wherein said lighting system comprises an optical device according to claim 1.

11. The lighting system according to claim 10, wherein said second light source comprises a pair of light-emitting diodes, each at one end of said second light guide.

12. The lighting system according to claim 10, wherein said at least one first light source is configured to emit a flashing turn-signal light flux.

13. The lighting system according to claim 12, wherein said flashing turn-signal light flux is a sequential turn-signal light flux.

14. The lighting system according to claim 10, wherein said second light source is configured to emit a daytime running flux.

15. The optical device according to claim 2, wherein said elliptical outline of said cross section comprises a frusto-conical portion, the small base of which corresponds to said coupling zone.

16. The optical device according to claim 2, wherein said second light guide comprises at least one second segment, a section of which comprises a portion having an elliptical outline.

17. The optical device according to claim 3, wherein said second light guide comprises at least one second segment, a section of which comprises a portion having an elliptical outline.

18. The optical device according to claim 4, wherein said second light guide comprises at least one second segment, a section of which comprises a portion having an elliptical outline.

19. The optical device according to claim 2, wherein a combined thickness of said exit face of said at least one first light guide is larger than or equal to a corresponding thickness of said coupling zone of said second light guide.

20. The optical device according to claim 6, wherein a combined thickness of said exit face of said at least one first light guide is larger than or equal to a corresponding thickness of said coupling zone of said second light guide.

* * * * *